Figure 1:
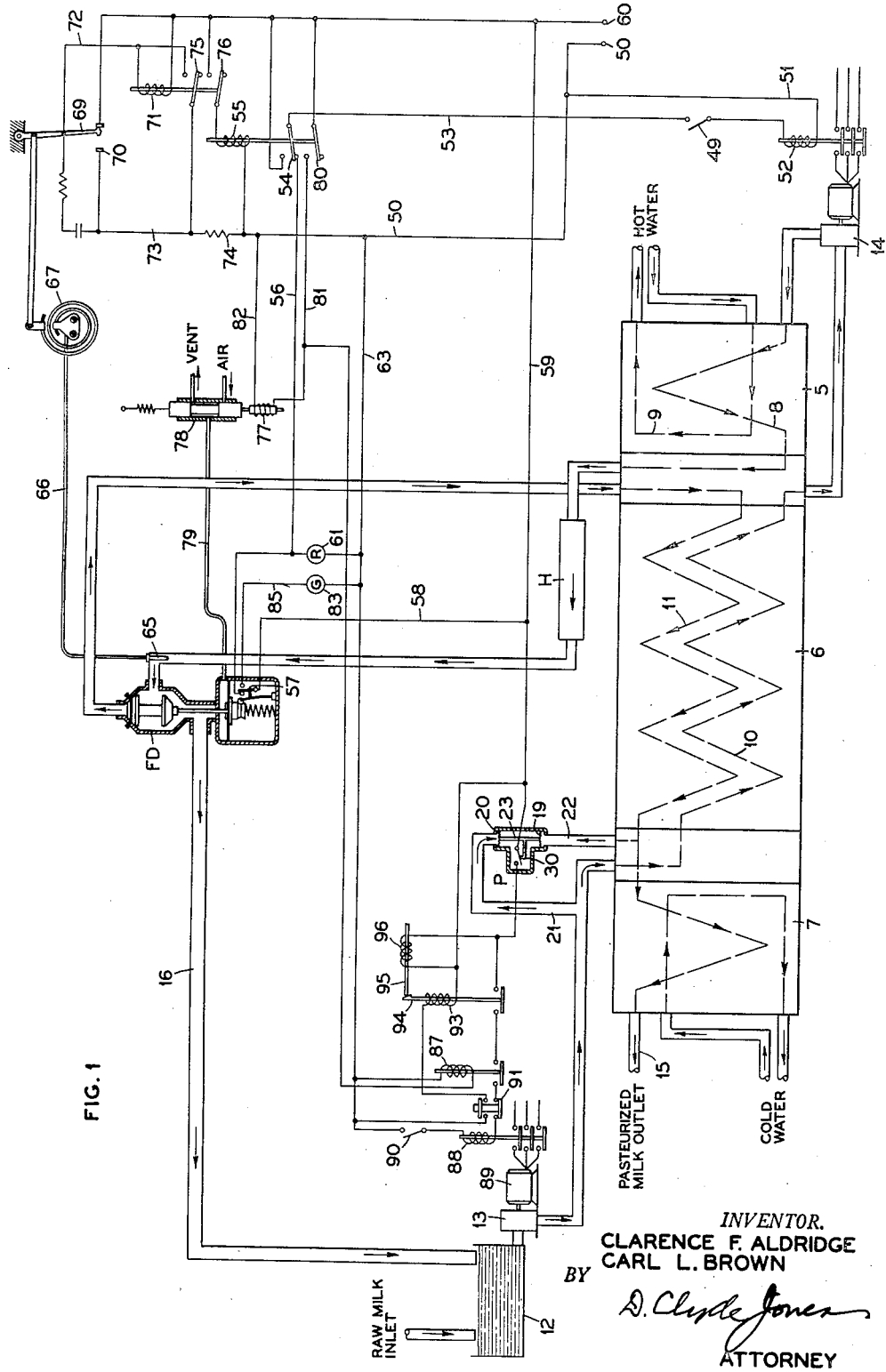

April 3, 1951     C. F. ALDRIDGE ET AL     2,547,430

PASTEURIZING CONTROL SYSTEM

Filed Aug. 7, 1948     2 Sheets-Sheet 1

INVENTOR.
CLARENCE F. ALDRIDGE
CARL L. BROWN
BY
D. Clyde Jones
ATTORNEY

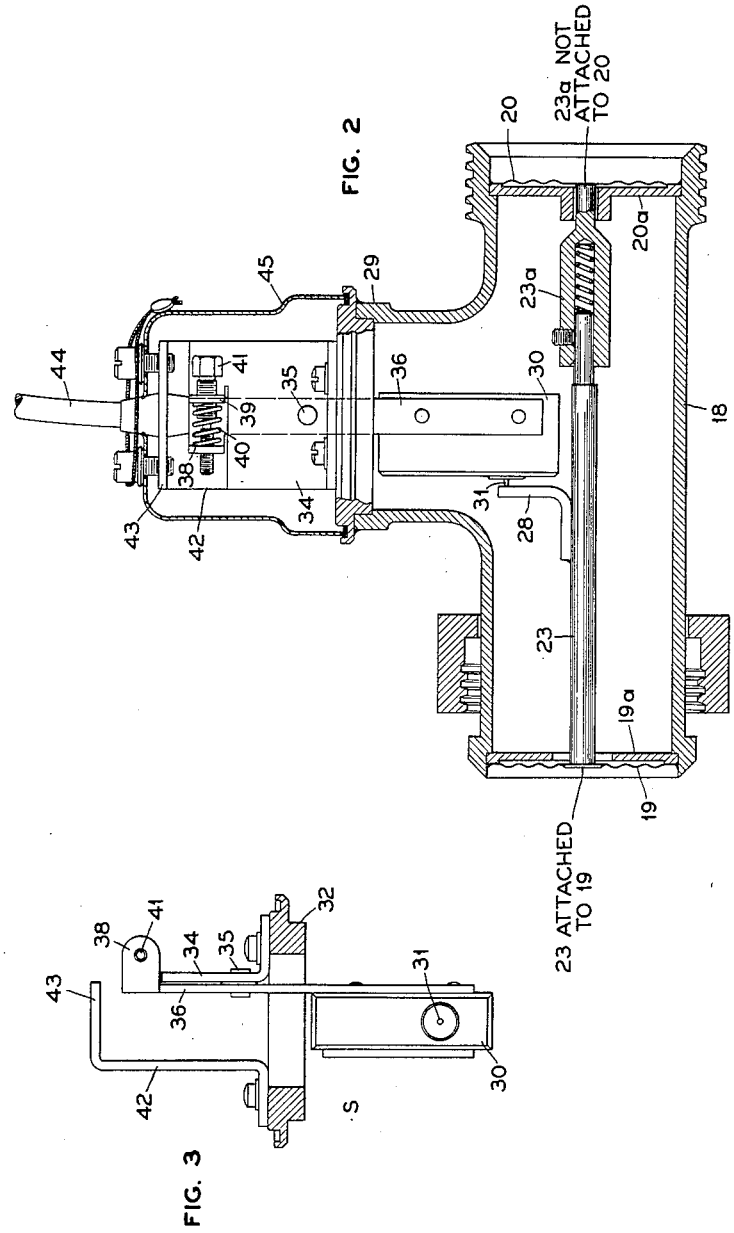

Patented Apr. 3, 1951

2,547,430

UNITED STATES PATENT OFFICE 2,547,430

PASTEURIZING CONTROL SYSTEM

Clarence F. Aldridge and Carl L. Brown, Rochester, N. Y., assignors to Taylor Instrument Companies, Rochester, N. Y., a corporation of New York Application August 7, 1948, Serial No. 43,042

1 Claim. (Cl. 257—2)

This invention relates to a pasteurizing system and to a differential switch for use therein.

In the pasteurization of a liquid such as milk or the like, it is customary to cause the liquid, after it has been pasteurized, to flow through a regenerator in heat exchange relation to some of the flowing unpasteurized liquid so that a portion of the heat in the pasteurized liquid can be recovered. If a leak develops in the regenerator of the present apparatus it is possible, under certain pressure conditions, for the unpasteurized liquid to leak into the pasteurized liquid with the resultant contamination.

In accordance with the present invention there is provided a pasteurizing system in which the pasteurized liquid is normally maintained at a higher pressure than the pressure of the unpasteurized liquid in heat exchange relation therewith so that any leakage will be from the pasteurized liquid to the unpasteurized liquid and not vice versa. However, if this normal pressure condition becomes reversed, provision is made for stopping the flow of at least one of said liquids and for preventing the resumption of flow until the operator starts it after the required pressure conditions have been satisfied.

The various features and advantages of the invention will appear from the detailed description and claim when taken with the drawing in which Fig. 1 is a diagrammatic showing of a pasteurizing system in accordance with the present invention; Fig. 2 is a longitudinal section through a differential switching unit which is incorporated in the system of Fig. 1 and which forms a part of the present invention; and Fig. 3 is a detailed view of a portion of the switching unit, partially broken away showing the microswitch and its mounting.

The present invention is intended for use in a pasteurizing system more completely disclosed in Patent 2,472,984 of Raymond E. Olson, granted June 14, 1949, and is an improvement in the invention disclosed in Patent 2,455,605 of Raymond E. Olson, granted December 7, 1948. In that system there is employed a combined pasteurizing unit 5, a regenerating unit 6, and a cooling unit 7. In the pasteurizing unit the milk or other liquid to be pasteurized flows through a set of coils or passages 8 in heat exchange relation to a set of heating coils or passages 9 through which there is recirculated water maintained at a temperature slightly above the pasteurizing temperature.

The regenerating unit 6 includes two passageways 10 and 11 in heat exchange relation to each other. The raw milk from the tank 12 is pumped by a so-called booster pump 13 (which may be of the centrifugal type) through the passageway 10 and by the timing pump 14 (which is preferably of the positive type) through the passageway 8 of the pasteurizer. The milk leaving the pasteurizer passageway 8 passes into a suitable holding tube H through which it travels for the required fifteen second holding interval required in so-called short time pasteurization and then flows through the flow diversion valve FD through the passageway 11 of the regenerator. Thus the regenerator conducts the pasteurizing milk from the pasteurizer in heat exchange relation to the raw milk in the passageway 10 thereby serving to cool the pasteurized milk and to heat partially the incoming raw milk. From the passageway 11 of the regenerator 6, the pasteurized milk flows through the cooling unit 7 to the discharge pipe 15.

If, however, the milk has not been heated to the proper temperature in passageway 8, suitable means, to be described, operates the flow diversion valve FD, to divert the improperly processed milk through a pipe 16 to the tank 12 so that this milk can be reprocessed. The two passageways 10 and 11 through the regenerator, are normally defined by a series of plates that can be readily taken apart and reassembled daily for purposes of cleaning. In view of this construction it is possible, on rare occasions, for the milk in one passage to leak into the other passage especially if the raw milk is under a higher pressure than the pasteurized milk in the other passage, then the pasteurized milk will become contaminated.

In accordance with the present invention, provision is made for insuring that the pasteurized milk in the regenerator will always be at a higher pressure than the raw milk in the regenerating unit so that any leakage in the regenerator will be from the pasteurized milk to the raw milk. If however, this desired pressure relation becomes reversed, there is provided a differential pressure unit which will immediately function with related control mechanism to stop the flow of milk through one or both passages in the regenerator. For this purpose there is provided a sanitary differential pressure unit P, including a T-shaped fitting 18 having its opposing ends respectively sealed by the flexible corrugated diaphragms 19 and 20, which are backed by suitable protective stops 19a and 20a (Fig. 2). A branch pipe 21 which is connected to the inlet of the passageway 10 applies the pressure of the raw milk to the upper surface of the diaphragm 20 (Fig. 1). Similarly, the branch pipe 22 which is connected to the outlet of the pasteurized milk passageway 11, applies the pressure of the pasteurized milk to the lower surface of the diaphragm 19. A rod 23 has one of its ends secured at the inner surface of the diaphragm 19. The other end of the rod 23 is provided with an adjustable telescopic extension 23a which normally just rests against diaphragm 20. It should be mentioned that the last-mentioned end of rod 23 is not attached to diaphragm 20. This rod has a bracket 28 secured thereto at a point opposite the side opening 29 in the fitting 18. A switching unit generally designated S (Fig. 3), includes a micro-switch 30 which has its actuating button 31 supported in a position to cooperate with the free end of the bracket 28.

The switch S comprises an annular plate 32 having its outer margin adapted to be sealed to the fitting in the opening 29. The plate 32 carries a projecting support 34. The support has pivoted thereon at 35, a lever 36 on the lower end of which the micro-switch 30 is supported. The lever 36 is pivotally mounted so that the button 31 of the micro-switch 30 can be swung toward or away from the bracket 28 in order to select the pressure value at which the micro-switch will be operated. The swinging adjustment of the lever 36 may be effected in any well-known manner. As herein illustrated, this adjustment is effected by a flange 38 on the outer end of the lever 36 and a cooperating flange 39 on the outer end of the support 34, both flanges being in parallel planes which are also parallel to the principal axis of the lever 36. A differential adjusting screw 41, which passes through a coil spring 40 interposed between the flanges 38 and 39, is threaded into both of these flanges. Thus when the screw 41 is turned in one direction, these flanges will be drawn toward each other and when the screw is turned in the other direction the flanges will tend to be separated with the consequent swinging movement of the lever 36.

The plate 32 also has secured thereto the support 42 which projects therefrom in a direction parallel to the support 34. The support 42 terminates at its outer end in an angular flange 43 (Fig. 2). This flange carries the conductors 44 leading to the micro-switch 30, and also tightly holds the rim of a cuplike closure 45 in sealed relation with the plate 32.

In the operation of the system, it will be assumed that there is a source of hot water for heating the pasteurizer and that there is a source of cooling water or brine for circulation through the cooler 7. The attendant then closes the sustained contact switch 49 whereupon a circuit is completed from one side of the current source, conductors 50 and 51, winding of the solenoid 52, switch 49, conductor 53, armature 54 and back contact of solenoid 55, conductor 56, switch 57 in the position illustrated, since it is assumed that the flow diversion valve is in its diverted position, conductors 58, 59 and 60 to the other side of the current source. The solenoid 52 is energized in this circuit and completes an operating circuit to the motor of the timing pump 14. Pump 14 operates to draw the milk through the passageway 10. At the same time that the solenoid 52 is operated to start the pump 14, the red lamp 61 is lighted to indicate that the flow diversion valve is in its diverted position. Lamp 61 is lighted from one side of the current source, conductors 60, 59, and 58, switch 57 in the position illustrated, lamp 61, conductors 63 and 50 to the other side of the current source.

When the temperature of the milk discharged from the holding tube H is at the required pasteurizing temperature, the bulb 65 of the thermosensitive tube system including the capillary tube 66 and the Bourdon spring 67 is actuated to swing the blade 69 of the thermal switch into engagement with the contact 70. In response to this action, the flow diversion valve FD is moved to its forward flow position as a result of the completion of the following circuits. As soon as the movable blade 69 engages the fixed contact 70 of the thermal switch, a circuit is completed for energizing the solenoid 71. This circuit extends from one side of the current source, conductor 60, winding of the solenoid 71, conductor 72, switch contacts 69 and 70, conductor 73, resistor 74, conductor 50 to the other side of the current source. The solenoid 71 is energized in this circuit and locks itself operated independently of the thermal switch contacts 69 and 70, in a circuit now traced from the conductor 60, winding of the solenoid 71, its armature 75 and front contact, resistor 74, conductor 50 to the other side of the current source. As soon as the solenoid 71 is operated, it closes an energizing circuit for the solenoid 55. This circuit extends from one side of the current source, conductor 60, front contact and armature 76 of solenoid 71, winding of the solenoid 55, conductor 50 to the other side of the current source. With the solenoid 55 operated, a circuit is completed for the solenoid 77 of the electro-pneumatic valve 78. This valve supplies compressed air through the pipe 79 to the motor of the flow diversion valve FD, causing this valve to position its movable element in a forward flow position. As this valve assumes its new position, switch 57 is moved to its right hand position for a purpose to be described. The energizing circuit for the solenoid 77 of the electro-pneumatic valve 78 is traceable from one side of the current source, conductor 60, armature 80 and front contact of solenoid 55, conductor 81, winding of the solenoid 77, conductors 82 and 50 to the other side of the current source. When the solenoid 77 is energized, it applies compressed air through the pipe 79 to the motor of the flow diversion valve as previously referred to. When the switch 57 is moved to its right hand position, as just mentioned, the green lamp 83 is lighted to indicate that the flow diversion valve is in its forward flow position. The green lamp 83 is lighted in a circuit extending from one side of the current source conductors 50 and 63, lamp 83, conductor 85, switch 57, conductors 58, 59 and 60 to the other side of the current source.

The attendant now closes the toggle switch 90 and momentarily depresses the button 91 which completes a circuit for latch solenoid 93 from one side 50 of the current source, conductor 63, contacts of button 91, winding of solenoid 93, conductors 59 and 60 to the other side of the current source. Solenoid 93 closes its contacts and causes its latch 94 to engage the catch 95 of the catch solenoid 96 so that solenoid 93 is latched in its closed position until it is released by the operation of catch solenoid 96. In accordance with this invention, the catch solenoid 96 is shunted as long as the switch 30 is in its closed position, that is, while the pressure of the pasteurized milk in the regenerator is greater than the pressure of the raw milk in regenerating heat exchange relation therewith. Also, when the solenoid 55 is operated, the relay 87 is energized to complete a break point in the circuit of the relay 88 which connects the power leads to the motor 89. Motor 89 drives the centrifugal type booster pump 13 which advances the raw milk from the storage tank 12 through the regenerator 6.

In the event that the pressure of the pasteurized milk in the regenerator drops below the pressure of the raw milk in the regenerator, the switch P will open its contacts. This opens the short circuit around the winding of the catch solenoid 96 causing it to energize. Solenoid 96 on operating, withdraws its catch 95 from the latch 94 of latch solenoid 93 which releases. Solenoid 93, on releasing, opens the operating circuit of relay 88 which releases to open the operating circuit of pump motor 89, thereby stopping the pump 13. Thus raw pasteurized milk under abnormal pressure will not be advanced through the regenerator.

It should be pointed out that the latch solenoid 93 cannot be latched in its operated position until the manual button 91 has been depressed and until the pressure of the pasteurized milk in the regenerator is greater than the pressure of the raw milk therein so that the switch P will be closed. Thus, if this required pressure relation does not prevail, the depression of button 91 will be ineffective. While the latch solenoid 93 will be operated under the assumed condition during the depression of button 91, the catch solenoid 96 will be operated, since the switch 30 will be open to remove the shunt circuit about the winding of this solenoid.

It will be understood that low pressure or vacuum on the upperside of diaphragm 20 (Fig. 1) will not operate the switch P since the rod 23 and its extension 23a are not attached to diaphragm 20. Thus abnormally low pressure in the raw milk passage 10 will not operate the switch P to permit the flow of pasteurized milk under abnormal pressure conditions.

What we claim is:

In a pasteurizing system, a heating unit provided with a primary passage for a heating liquid and with a secondary passage for a liquid to be heated, said passages being in heat exchange relation with each other, means for causing said heating liquid to flow through said primary passage at a given pressure, means including an electrically operated pump and a circuit therefor for causing the liquid to be heated to flow through said secondary passage at a pressure normally lower than said given pressure, and a differential pressure switch controlling said circuit and responsive to a change in the normal pressure relation between the liquids in said passages for stopping said pump, said differential pressure switch comprising a T-shape fitting provided with a side opening and with two opposed end openings, a flexible diaphragm sealing each of said end openings, a rod within said fitting having one of its ends secured to the inner surface of a first one of said diaphragms and having its other end in contact relation with the second of said diaphragms so that it is free to move relatively thereto, switch contacts operable at said side opening and means movable by said rod for actuating said switch contacts, said fitting being connected in said system with said first diaphragm exposed to the pressure of liquid in said primary passage and with the second diaphragm exposed to pressure of the liquid in said secondary passage.

CLARENCE F. ALDRIDGE.
CARL L. BROWN.

REFERENCES CITED

The following references are of record in the file of this patent:

UNITED STATES PATENTS

| Number | Name | Date |
| --- | --- | --- |
| 457,572 | Bergmann | Aug. 11, 1891 |
| 936,329 | Lacke | Oct. 12, 1909 |
| 1,946,412 | Rowley | Feb. 6, 1934 |
| 2,094,319 | Faust | Sept. 28, 1937 |
| 2,204,644 | Adams | June 18, 1940 |
| 2,414,623 | Wildermuth | Jan. 21, 1947 |
| 2,455,605 | Olson | Dec. 7, 1948 |